US010994622B2

(12) United States Patent
Hori et al.

(10) Patent No.: US 10,994,622 B2
(45) Date of Patent: May 4, 2021

(54) VEHICLE AND CONTROL METHOD THEREOF

(71) Applicants: TOYOTA JIDOSHA KABUSHIKI KAISHA, Toyota (JP); FUJITSU TEN LIMITED, Kobe (JP)

(72) Inventors: Takaharu Hori, Toyota (JP); Fumiyoshi Kuribara, Toyota (JP); Daisuke Okajima, Kobe (JP)

(73) Assignees: Toyota Jidosha Kabushiki Kaisha, Toyota (JP); Fujitsu Ten Limited, Kobe (JP)

( * ) Notice: Subject to any disclaimer, the term of this patent is extended or adjusted under 35 U.S.C. 154(b) by 242 days.

(21) Appl. No.: 15/695,517

(22) Filed: Sep. 5, 2017

(65) Prior Publication Data

US 2018/0065487 A1    Mar. 8, 2018

(30) Foreign Application Priority Data

Sep. 7, 2016   (JP) .............................. JP2016-174543

(51) Int. Cl.
*B60L 53/00*    (2019.01)
*B60L 53/30*    (2019.01)
(Continued)

(52) U.S. Cl.
CPC ............. *B60L 53/00* (2019.02); *B60L 3/0046* (2013.01); *B60L 53/18* (2019.02); *B60L 53/305* (2019.02);
(Continued)

(58) Field of Classification Search
CPC .... B60L 3/0046; B60L 11/1809; B60L 3/003; B60L 53/00; B60L 53/305; B60L 53/18;
(Continued)

(56) References Cited

U.S. PATENT DOCUMENTS

2010/0289516 A1*  11/2010  Mitsutani ................ B60L 50/61
                                                       324/764.01
2011/0181104 A1*   7/2011  Kamaga .................. B60L 50/61
                                                         307/9.1
(Continued)

FOREIGN PATENT DOCUMENTS

EP         2 279 896 A2     2/2011
JP         2010-283944     12/2010
(Continued)

*Primary Examiner* — Richard Isla
*Assistant Examiner* — Johali A Torres Ruiz
(74) *Attorney, Agent, or Firm* — Finnegan, Henderson, Farabow, Garrett & Dunner, LLP (57) ABSTRACT

A vehicle comprises a motor configured to output a power for driving; a power storage device configured to supply electric power to the motor; a main relay provided between the motor and the power storage device; a power receiving connector configured to be connectable with a power feed connector of an external charger; and a charging relay connected with the power receiving connector and connected with the power storage device via the main relay. This vehicle further comprises a control device configured to determine whether electric power from the external charger is supplied to the power receiving connector during charging of the power storage device with the electric power from the external charger in closed positions of the main relay and the charging relay and to open the main relay when it is determined that the electric power from the external charger is not supplied to the power receiving connector.

4 Claims, 2 Drawing Sheets

(51) Int. Cl.
    *B60L 53/18* (2019.01)
    *B60L 58/12* (2019.01)
    *B60L 3/00* (2019.01)

(52) U.S. Cl.
    CPC ........... B60L 58/12 (2019.02); *B60L 2210/10* (2013.01); *B60L 2240/42* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
    CPC .......... B60L 53/60; B60L 53/14; B60L 58/12; B60L 2210/10; Y02T 10/7005; Y02T 10/642; Y02T 10/7088; Y02T 10/7216; Y02T 90/121; Y02T 90/127; Y02T 90/14; Y02T 90/128; Y02T 90/163
    USPC ......................................................... 320/104
    See application file for complete search history.

(56) References Cited

U.S. PATENT DOCUMENTS

| | | | | |
|---|---|---|---|---|
| 2012/0133204 | A1* | 5/2012 | Ang | B60L 3/0069 307/10.1 |
| 2012/0274277 | A1* | 11/2012 | Masuda | B60L 50/61 320/109 |
| 2015/0375621 | A1* | 12/2015 | Ono | B60L 53/20 307/10.1 |
| 2016/0172897 | A1* | 6/2016 | Iisaka | H01M 10/44 320/107 |

FOREIGN PATENT DOCUMENTS

| | | |
|---|---|---|
| JP | 2011-035975 A | 2/2011 |
| JP | 2016-101032 | 5/2016 |
| JP | 2016-101033 | 5/2016 |
| JP | 2016-119762 A | 6/2016 |

\* cited by examiner

Fig. 2

VEHICLE AND CONTROL METHOD THEREOF

This application claims priority to Japanese Patent Application No. 2016-174543 filed 7 Sep. 2016, the contents of which is incorporated herein by reference.

TECHNICAL FIELD

The present disclosure relates to a vehicle equipped with a power storage device configured to be chargeable with electric power from an external charger, and to a control method thereof.

BACKGROUND

A proposed configuration of this vehicle includes a system main relay provided between a motor and a power storage device; a power receiving connector placed in a charging port provided in a vehicle body and configured to be connectable with a power feed connector of an external charger; and a charging relay connected with the power receiving connector and connected with the power storage device via the system main relay (as described in, for example, JP 2016-101032A). This proposed vehicle performs failure diagnosis of the charging relay after completion of charging of the power storage device using the external charger, such as to determine presence or absence of a closing failure due to adhesion of the charging relay or the like.

SUMMARY

Even when there is no closing failure of the charging relay due to adhesion or the like on completion of charging of the power storage device with electric power from the external charger, the charging relay is likely to cause adhesion by some reason during next charging or prior to start of next charging. In the case of a closing failure of the charging relay occurring due to adhesion or the like, even when electric power from the external charger is not supplied to the power receiving connector, there is a possibility that a high voltage is applied from the power storage device to the power receiving connector. There is accordingly still a room for improvement with regard to the prior art vehicle.

A main object of the present disclosure is to more effectively enhance the safety of a vehicle equipped with a power storage device that is configured to be chargeable with electric power front an external charger.

According to one aspect of the disclosure, there is provided a vehicle comprising: a motor configured to output a power for driving; a power storage device configured to supply electric power to the motor; a main relay provided between the motor and the power storage device; a power receiving connector configured to be connect able with a power feed connector of an external charger; a charging relay connected with the power receiving connector and connected with the power storage device via the main relay; and a control device configured to determine whether electric power from the external charger is supplied to the power receiving connector during charging of the power storage device with the electric power from the external charger in closed positions of the main relay and the charging relay and to open the main relay when it is determined that the electric power from the external charger is not supplied to the power receiving connector.

This configuration more effectively enhances the safety of the vehicle equipped with the power storage device that is configured to be chargeable with the electric power from the external charger.

DESCRIPTION OF EMBODIMENTS

The following describes some aspects of the present disclosure with reference to an embodiment.

Figure 1:
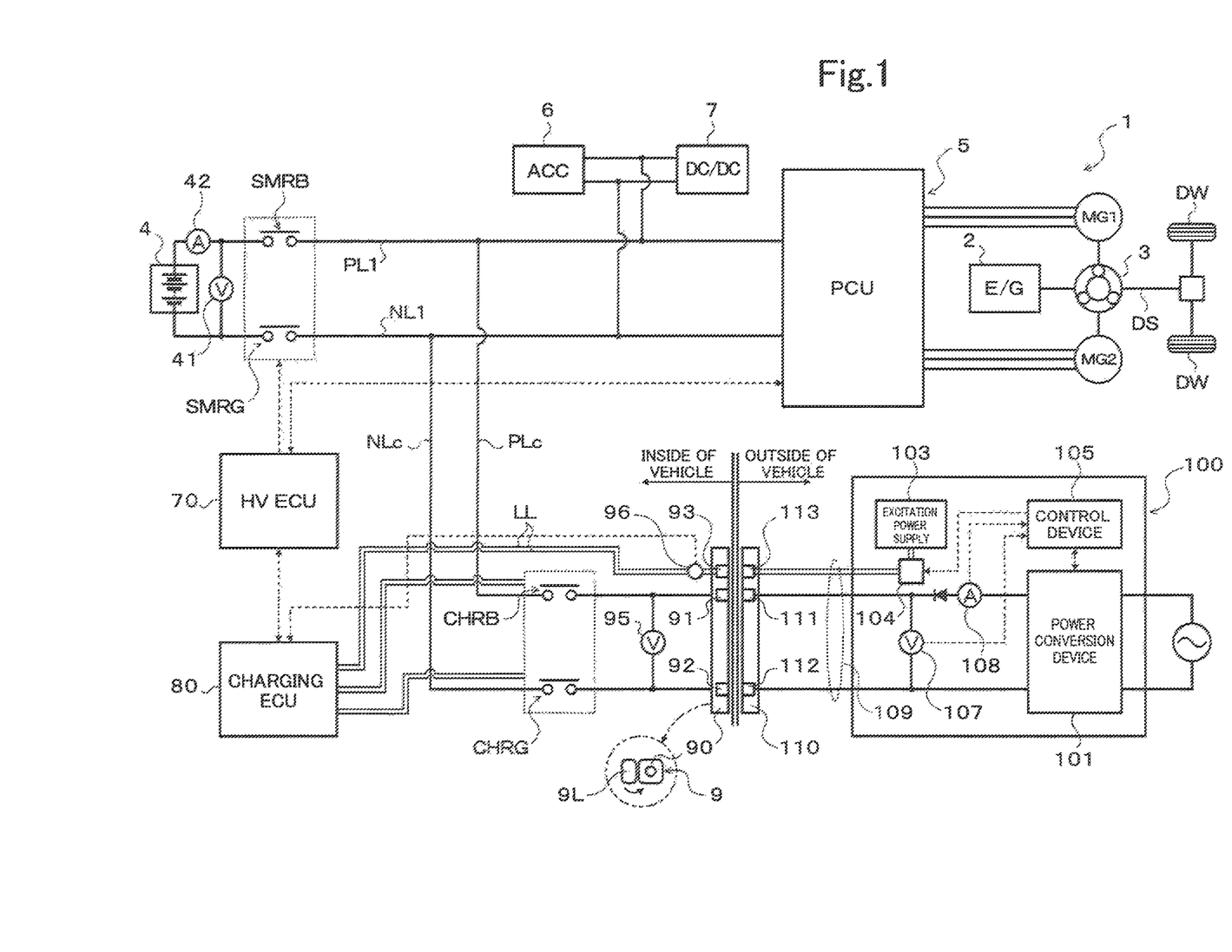
FIG. 1 is a schematic configuration diagram illustrating a vehicle of the present disclosure.

FIG. 1 is a schematic configuration diagram illustrating a hybrid vehicle 1 as a vehicle of the present disclosure. As illustrated, the hybrid vehicle 1 includes an engine 2, a single pinion-type planetary gear 3, motors MG1 and MG2 respectively configured as synchronous motor generators, a power storage device (battery) 4, a power control unit (hereinafter referred to as "PCU") 5 connected with the power storage device 4 and configured to drive the motors MG1 and MG2, and a hybrid electronic control unit (hereinafter referred to as "HVECU") 70 configured to control the entire vehicle.

The engine 2 is an internal combustion engine configured to generate power by explosive combustion of a mixture of a hydrocarbon fuel such as gasoline or light oil and the air and is controlled by an engine electronic control unit (not shown). The planetary gear 3 includes a sun gear that is connected with a rotor of the motor MG1, a ring gear that is connected with a driveshaft DS and is also connected with a rotor of the motor MG2 via a reducer or a transmission (not shown), and a planetary carrier that is arranged to support a plurality of pinion gears in a rotatable manner and coupled with a crankshaft of the engine 2 via a damper (not shown). The driveshaft DS is coupled with left and right wheels (drive wheels) DW via a gear mechanism or a differential gear (not shown).

The motor MG1 is mainly operated as a generator that is driven by the engine 2 under load operation to generate electric power. The motor MG2 is mainly operated as a motor that is driven with at least one of electric power from the power storage device 4 and electric power from the motor MG1 to generate power for driving and also serves to output a regenerative braking force during braking of the hybrid vehicle 1. The motors MG1 and MG2 are configured to transmit electric power to and from the power storage device 4 via the PCU 5.

The power storage device 4 may be, for example, a lithium ion rechargeable battery or a nickel metal hydride battery having a rated output voltage of 200 V to 300 V. A positive electrode-side power line PL1 is connected with a positive terminal of the power storage device 4 via a positive electrode-side system main relay SMRB, and a negative electrode-side power line NL1 is connected with a negative terminal of the power storage device 4 via a negative electrode-side system main relay SMRG. The power storage device 4 is provided with a voltage sensor 41 configured to detect an inter-terminal voltage VB of the power storage device 4 and with a current sensor 42 configured to detect an electric current (charge-discharge current) IB flowing through the power storage device 4. Additionally, a compressor (not shown) (for example, electric inverter compressor) of an air conditioning device 6 configured to perform air conditioning in a vehicle interior and a DC/DC converter 7 configured to step down the electric power from the power storage device 4 and supply the stepped-down power to a plurality of auxiliary machines (not shown) and an auxiliary machine battery (not shown) are further connected with the positive electrode-side power line PL1 and the negative electrode-side power line NL1.

The PCU 5 includes, for example, a first inverter configured to drive the motor MG1, a second inverter configured to drive the motor MG2, a voltage conversion module (step-up/down converter) configured to step up the electric power from the power storage device 4, a filter capacitor, a smoothing capacitor, a current sensor, a voltage sensor and a motor electronic control unit configured to control the first and second inverters and the voltage conversion module (all omitted from illustration). Each of the first inverter and the second inverter is configured to include six transistors and six diodes connected in parallel in a reverse direction with the respective transistors. The voltage conversion module is configured to include, for example, two insulated gate bipolar transistors (IGBT), two diodes connected in parallel in a reverse direction with the respective transistors, and a reactor. The motor electronic control unit is configured to generate switching control signals for the respective transistors of the first and second inverters and for the respective transistors of the voltage conversion module based on various input signals and to perform switching control of these respective transistors.

The HVECU 70 is configured by a microcomputer including a CPU and the like (not shown) and is connected with other electronic control units, various sensors and the like via a network (CAN). The HVECU 70 is configured to receive inputs of signals from the other electronic control devices, the various sensors and the like and perform controls of the entire vehicle including a drive control of the hybrid vehicle 1 based on the input signals and the like. The HVECU 70 is also configured to additionally control opening and closing of the positive electrode-side system main relay SMRB and the negative electrode-side system main relay SMRG described above. Closing (turning on) the positive electrode-side system main relay SMRB and the negative electrode-side system main relay SMRG by the HVECU 70 connects the power storage device 4 with the PCU 5. Opening (turning off) both the relays SMRB and SMRG by the HVECU 70 disconnects the power storage device 4 from the PU 5 (i.e., blocks the connection between the power storage device 4 and the PCU 5).

The hybrid vehicle 1 of the embodiment is configured as a plug-in hybrid vehicle that enables the the power storage device 4 to be charged with electric power from an external charger (DC rapid charger) 100 installed in, for example, a charging station or a parking place. As illustrated, the hybrid vehicle 1 includes a charging electronic control unit (hereinafter referred to as "charging ECU") 80 configured to control and manage charging of the power storage device 4 using the external charger 100 and a power receiving connector 90 configured to be detachable attached to a power feed connector 110 of the external charger 100. The charging ECU 80 is configured by a microcomputer including a CPU and the like (not shown).

As shown in FIG. 1, the power receiving connector 90 is placed in a charging port 9 provided in a vehicle lateral portion of the hybrid vehicle 1. A charging lid (cover member) 9L configured to be openable and closable and a lock mechanism (not shown) configured to lock the power feed connector 110 connected with the power receiving connector 90 are provided in the charging port 9. When the charging lid 9L is closed, the power feed connector 90 is covered by the charging lid 9L such as not to be accessible from the outside. The power receiving connector 90 is configured to include a positive terminal 91 that is connected with a positive electrode-side charging power line PLc, a negative terminal 92 that is connected with a negative electrode-side charging power line NLc, a low voltage terminal 93 that is connected with a low voltage power line LL and a signal terminal (not shown) that is connected with a communication line.

A positive electrode-side charging relay CHRB is provided in the middle of the positive electrode-side charging power line PLc that is connected with the positive terminal 91 of the power receiving connector 90. The positive electrode-side charging power line PLc is connected with the positive electrode-side power line PL1 in a location between the positive electrode-side system main relay SMRB and the PCU 5. A negative electrode-side charging relay CHRG is provided in the middle of the negative electrode-side charging power line NLc that is connected with the negative terminal 92 of the power receiving connector 90. The negative electrode-side charging power line NLc is connected with the negative electrode-side power line NL1 in a location between the negative electrode-side system main relay SMRG and the PCU 5. This configuration causes the positive electrode-side charging relay CHRB and the negative electrode-side charging relay CHRG (i.e., the positive electrode-side charging power line PLc and the negative electrode-side charging power line NLc) to be connected with the power receiving connector 90 and to be also connected with the power storage device 4 respectively via the positive electrode-side system main relay SMRB and via the negative electrode-side system main rely SMRG. The positive electrode-side charging relay CHRB and the negative electrode-side charging relay CHRG respectively have coils that are connected with the charging ECU 80 via respective power lines. Additionally, the low voltage power line LL that is connected with the low voltage terminal 93 of the power receiving connector 90 and the communication line that is connected with the signal terminal are also connected with the charging ECU 80.

A relay end voltage sensor 95 is placed between the power receiving connector 90 and both the positive electrode-side charging relay CHRB and the negative electrode-side charging relay CHRG, such as to detect a voltage supplied from the power receiving connector 90 to the positive electrode-side charging relay CHRB, i.e., a voltage between the positive electrode-side charging power line PLc and the negative electrode-side charging power line NLc. Additionally, a low voltage-side voltage sensor 96 is placed in the power receiving connector 90 or in the low voltage power line LL, such as to detect supply or no supply of electric power to the low voltage terminal 93 and the low voltage power line LL. Detection signals of the relay end voltage sensor 95 and the low voltage-side voltage sensor 96 are sent to the charging ECU 80. According to this embodiment, each of the relay end voltage sensor 95 and the low voltage-side voltage sensor 96 is configured not to output an ON signal when the applied voltage is lower than a predetermined ON threshold value and is configured to output the ON signal when the applied voltage is equal to or higher than the predetermined ON threshold value. According to another embodiment, each of the relay end voltage sensor 95 and the low voltage-side voltage sensor 96 may be provided as an analog sensor configured to output a voltage value. Furthermore, the low voltage-side voltage sensor 96 may be replaced with a current sensor.

As shown in FIG. 1, the external charger 100 includes a power conversion device 101, an excitation power supply 103 and a control device 105 configured to control the power conversion device 101 and the excitation power source 103, in addition to the power feed connector 110. The power conversion device 101 includes, for example, rectifier circuit, a transformer and a switching circuit and is configured to convert an AC power supplied from an AC power supply such as a commercial power supply to a DC power. The excitation power supply 103 is a low voltage (for example, DC 12 V) DC power supply. The control device 105 is configured by a microcomputer including a CPU and the like (not shown). The power feed connector 110 is connected with the power conversion device 101, the excitation power supply 103 and the control device 105 via a power feed cable 109.

As shown in FIG. 1, the power feed connector 110 includes a positive terminal 111 that is connected with the power conversion device 101 via a positive electrode-side power feed line of the power feed cable 109, a negative terminal 112 that is connected with the power conversion device 101 via a negative electrode-side power feed line of the power feed cable 109, a low voltage terminal 113 that is connected with a low voltage power feed line of the power feed cable 109, and a signal terminal (not shown) that is connected with a communication line of the power feed cable 109. As illustrated, the low voltage power feed line that is connected with the low voltage terminal 113 of the power feed connector 110 is connected with the excitation power supply 103 of the external charger 100 via a relay 104. The communication line that is connected with the signal terminal is connected with the control device 105 of the external charger 100.

The external charger 100 further includes a voltage sensor 107 configured to detect a voltage supplied from the power conversion device 101 to the power feed connector 110 (voltage between the positive electrode-side power feed line and the negative electrode-side power feed line), i.e., a supply voltage Vs of the external charger 100 (power conversion device 101), and a current sensor 108 configured to detect an electric current flowing through the positive electrode-side power feed line, i.e., a supply current Is of the external charger 100 (power conversion device 101). Detected values of the the voltage sensor 107 and the current sensor 108 are sent to the control device 105.

Connecting the power feed connector 110 of the external charger 100 configured as described above with the power receiving connector 90 of the hybrid vehicle 1 at a stop closes the positive electrode-side system main relay SMRB, the negative electrode-side system main relay SMRG, the positive electrode-side charging relay CRHB and the negative electrode-side charging relay CHRG and thereby enables the power storage device 4 to be charged with electric power from the external charger 100 (i.e., high voltage charging power). Connecting the power feed connector 110 with the power receiving connector 90 also electrically connects the low voltage terminal 113 of the power feed connector 110 with the low voltage terminal 93 of the power receiving connector 90 and thereby enables electric power from the excitation power supply 103 of the external charger 100 to be supplied to the charging ECU 80 via the power feed connector 110, the power receiving connector 90 and the low voltage power line LL. According to this embodiment, when a predetermined panel operation (charging preparation process) is completed on the external charger 100-side after connection of the power feed connector 110 with the power receiving connector 90, the control device 105 of the external charger 100 closes the relay 104 such as to supply electric power from the excitation power supply 103 toward the hybrid vehicle 1 (i.e., toward the charging ECU 80).

The charging ECU 80 receives the electric power from the excitation power supply 103 as a charging start command and supplies the electric power from the low voltage power line LL as an excitation power to the coils of the positive electrode-side charging relay CHRB and the negative electrode-side charging relay CHRG, such as to close (turn on) both the relays CHRB and CHRG. The charging ECU 80 also stops power supply from the low voltage power line LL to the coils of the positive electrode-side charging relay CHRB and the negative electrode-side charging relay CHRG, such as to open (turn off) both the relays CHRB and CHRG. In the case of some abnormality, failure or the like occurring on the external charger 100-side, the configuration of supplying the excitation power from the external charger 100 to the positive electrode-side charging relay CHRB and the negative electrode-side charging relay CHRG of the hybrid vehicle 1 enables the control device 105 to stop the power supply from the excitation power supply 103 and open the positive electrode-side charging relay CHRB and the negative electrode-side charging relay CHRG without waiting for the control by the charging ECU 80.

Figure 2:
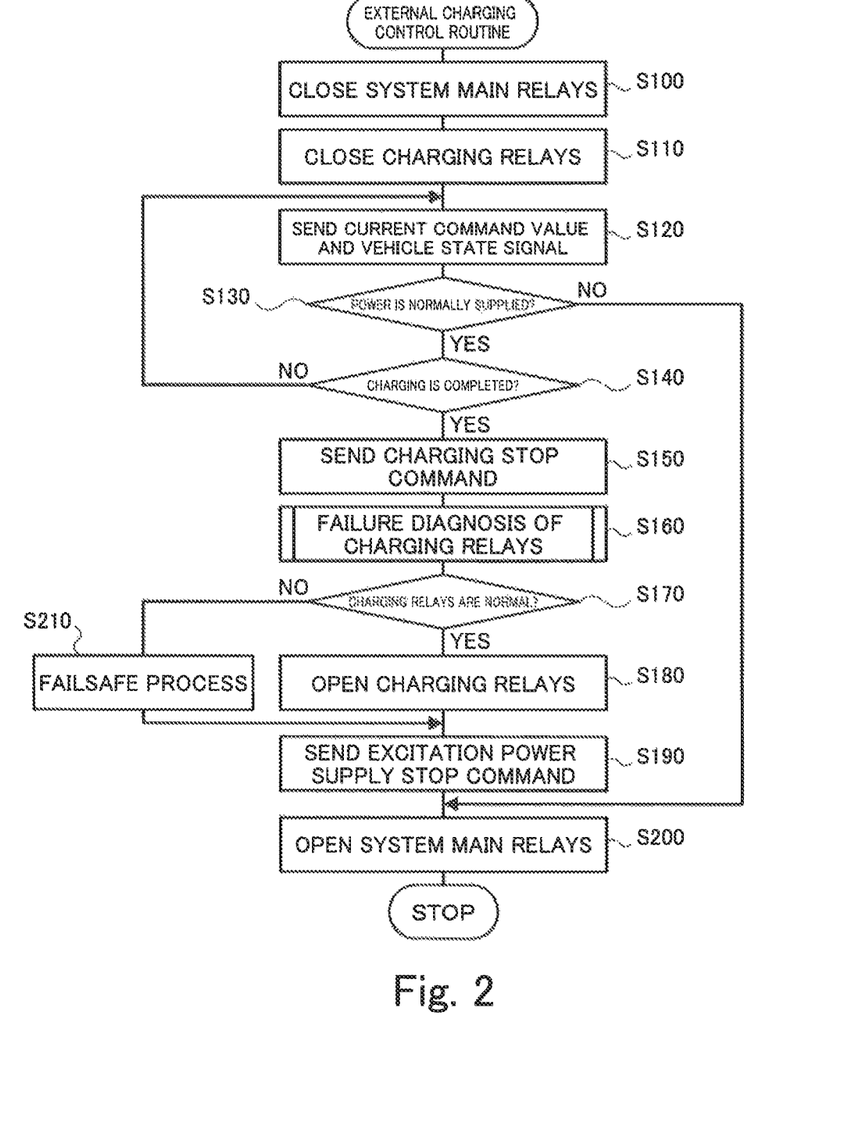
FIG. 2 is a flowchart showing one example of an external charging control routine performed in the vehicle of the present disclosure.

FIG. 2 is a flowchart showing one example of an external charging control routine performed by the charging ECU 80 of the hybrid vehicle 1. After connection of the power feed connector 110 of the external charger 100 with the power receiving connector 90 of the hybrid vehicle 1, when receiving the electric power (charging start command) from the excitation power supply 103 via the low voltage power line LL, the charging ECU 80 starts the external charging control routine of FIG. 2. When the external charging control routine is triggered, the charging ECU 80 first sends a command signal for closing the positive electrode-side-system main relay SMRB and the negative electrode-side system main relay SMRG to the HVECU 70 (step S100). After the positive electrode-side system main relay SMRB and the negative electrode-side system main relay SMRG are closed, the charging ECU 80 supplies the electric power from the excitation power supply 103 to the positive electrode-side charging relay CHRB and the negative electrode-side charging relay CHRG, such as to close both the relays CHRB and CHRG (step S110).

The charging ECU 80 subsequently sets a current command value according to the conditions of the power storage device 4, for example, an SOC (state of charge) and an allowable charging power Win, using, for example, a map provided in advance, and sends the current command value along with a vehicle state signal indicating the state of the hybrid vehicle 1 to the control device 105 of the external charger 100 (step S120). The control device 105 of the external charger 100 receives the current command value from the charging ECU 80 and controls the power conversion device 101 such as to output a direct current corresponding to the current command value. The direct current corresponding to the current command value sent from the charging ECU 80 is accordingly supplied from the power conversion device 101 of the external charger 100 to the power storage device 4 via, for example, the power feed cable 109, the power feed connector 110, the power receiving connector 90, the positive electrode-side charging power line PLc and the negative electrode-side charging power line NLc, such as to charge the power storage device 4. This configuration enables the hybrid vehicle 1 to provide a request for the adequate electric current according to the conditions of the power storage device 4 to the external charger 100 and thereby enables the power storage device 4 to be quickly charged while protecting the power storage device 4.

After the processing of step S120, the charging ECU 80 determines whether the charging power from the external charger 100 and the excitation power from the external charger 100 to the positive electrode-side charging relay CHRB and the negative electrode-side charging relay CHRG are normally supplied to the power receiving connector 90, based on a signal input from the low voltage-side voltage sensor 96 (step S130). At step S130, when an ON signal is input from the low voltage-side voltage sensor 96, the charging ECU 80 determines that the charging power and the excitation power from the external charger 100 are normally supplied to the power receiving connector 90 (i.e., that the external charger 100 is normally connected with the power receiving connector 90) without causing any of separation of the power feed connector 110 from the power receiving connector 90 due to, for example, an abnormality of the lock mechanism, disconnection of the power feed cable 109 (at least one of the positive electrode-side power feed line, the negative electrode-side power feed line and the low voltage power feed line) of the external charger 100 and the like.

When it is determined at step S130 that the charging power and the excitation power from the external charger 100 are normally supplied to the power receiving connector 90, the charging ECU 80 subsequently determines whether the SOC of the power storage device 4 reaches a predetermined target value (for example, 70 to 80%) and that charging of the power storage device 4 is completed (step S140). The charging ECU 80 repeatedly performs the processing of steps S120 to S140 until it is determined at step S140 that charging of the power storage device 4 is completed (i.e., during charging of the power storage device 4). When it is determined at step S140 that charging of the power storage device 4 is completed, the charging ECU 80 sends a charging stop command to the control device 105 of the external charger 100 (step S150), such as to stop the supply of the charging power from the external charger 100. When receiving the charging stop command, the control device 105 of the external charger 100 controls the power conversion device 101 to stop the output of the direct current, while continuing the supply of the excitation power from the excitation power supply 103 toward the hybrid vehicle 1.

On completion of charging of the power storage device 4, the charging ECU 80 performs a failure diagnosis of the positive electrode-side charging relay CHRB and the negative electrode-side charging relay CHRG (step S160). More specifically, at step S160, the charging ECU 80 stops the supply of the excitation power to both the positive electrode-side charging relay CHRB and the negative electrode-side charging relay CHRG and determines whether a signal is input from the relay end voltage sensor 95. When the charging ECU 80 receives the input of a signal from the relay end voltage sensor 95 in the state that both the positive electrode-side charging relay CHRB and the negative electrode-side charging relay CHRG are to be opened, this means that a voltage is applied from the power storage device 4 to the relay end voltage sensor 95 via the positive electrode-side charging relay CHRB and the negative electrode-side charging relay CHRG. Accordingly this indicates closing failures of both the positive electrode-side charging relay CHRB and the negative electrode-side charging relay CHRG, due to adhesion or the like.

In the case where both the positive electrode-side charging relay CHRB and the negative electrode-side charging relay CHRG do not have closing failures, the charging ECU 80 stops only the supply of the excitation power to the positive electrode-side charging relay CHRB and determines whether a signal is input from the relay end voltage terminal 95. When the charging ECU 80 receives the input of a signal from the relay end voltage sensor 95 in the state that only the positive electrode-side charging relay CHRB is to be opened, this means that a voltage is applied from the power storage device 4 to the relay end voltage sensor 95 via the positive electrode-side charging relay CHRB and the negative electrode-side charging relay CHRG. Accordingly this indicates a closing failure of the negative electrode-side charging relay CHRG, due to adhesion or the like. The charging CPU 80 then stops only the supply of the excitation power to the negative electrode-side charging relay CHRG and determines whether a signal is input from the relay end voltage terminal 95. When the charging ECU 80 receives the input of a signal from the relay end voltage sensor 95 in the state that only the negative electrode-side charging relay CHRG is to be opened, this means that a voltage is applied from the power storage device 4 to the relay end voltage sensor 95 via the positive electrode-side charging relay CHRB and the negative electrode-side charging relay CHRG. Accordingly this indicates a closing failure of the positive electrode-side charging relay CHRB, due to adhesion or the like.

After the processing of step S160 as described above, the charging ECU 80 determines whether both the positive electrode-side charging relay CHRB and the negative electrode-side charging relay CHRG are normal (step S170). When it is determined at step S170 that both the positive electrode-side charging relay CHRB and the negative electrode-side charging relay CHRG are normal, the charging ECU 80 stops the power supply from the low voltage power line LL to the coils of the positive electrode-side charging relay CHRB and the negative electrode-side charging relay CHRG, such as to open both the relays CHRB and CHRG (step S180). After the positive electrode-side charging relay CHRB and the negative electrode-side charging relay CHRG are opened, the charging ECU 80 sends an excitation power supply stop command for stopping the supply of the excitation power, to the control device 105 of the external charger 100 (step S190). The charging ECU 80 then sends a command signal for opening the positive electrode-side system main relay SMRB and the negative electrode-side system main relay SMRG to the HVECU 70 (step S200) and terminates this routine.

When it is determined at step S170 that at least one of the positive electrode-side charging relay CHRB and the negative electrode-side charging relay CHRG has a closing failure, on the other hand, the charging ECU 80 performs a predetermined failsafe process (step S210) and sends the excitation power supply stop command for stopping the supply of the excitation power, to the control device 105 of the external charger 100 (step S190). The charging ECU 80 then ends the command signal for opening the positive electrode-side system main relay SMRB and the negative electrode-side system main relay SMRG to the HVECU 70 (step S200) and terminates this routine. When it is determined that both the positive electrode-side charging relay CHRB and the negative electrode-side charging relay CHRG have closing failures, the charging ECU 80 sends an alarm display command to a meter device (not shown) in order to light up a predetermined alarm lamp and prohibits driving of the hybrid vehicle 1 at step S210. When it is determined that one of the positive electrode-side charging relay CHRB and the negative electrode-side charging relay CHRG has a closing failure, the charging ECU 80 sends an alarm display command to a meter device (not shown) and prohibits driving of the hybrid vehicle 1 under a predetermined condition that is unlikely to ensure the user's safety.

When it is determined at step S130 that there is separation of the power feed connector 110 or disconnection of the power feed cable 109 of the external charger 100 and that the charging power and the excitation power from the external charger 100 are not normally supplied to the power receiving connector 90 (i.e., that the external charger 100 is not normally connected with the power receiving connector 90), based on the signal input from the low voltage-side voltage sensor 96, on the other hand, the charging ECU 80 performs the processing of step S200 and terminates this routine without performing the processing of steps S140 to S190 and the processing of step S210. More specifically, when it is determined that the charging power and the excitation power from the external charger 100 are not normally supplied to the power receiving connector 90 during charging of the power storage device 4 using the external charger 100, the charging ECU 80 immediately opens the positive electrode-side system main relay SMRB and the negative electrode-side system main relay SMRG with omission of the failure diagnosis of the positive electrode-side charging relay CHRB and the negative electrode-side charging relay CHRG (step S160) and the other steps.

Even when a closing failure occurs in the positive electrode-side charging relay CHRB and the negative electrode-side charging relay CHRG due to adhesion or the like during charging or prior to start of charging of the power storage device 4 using the external charger 100, this configuration prevents a high voltage from being applied from the power storage device 4 to the power receiving connector 90 (terminal) placed in the charging port 9, which is accessible by the user or the like in the process of opening and closing the charging lid 9L or in the process of attachment or detachment of the power feed connector 110. As a result, this configuration more effectively enhances the safety of the hybrid vehicle 1 even when the charging power and the excitation power from the external charger 100 are not normally supplied to the power receiving connector 90 due to, for example, separation of the power feed connector 110 or disconnection of the power feed cable 109 of the external charger 100 during charging of the power storage device 4 using the external charger 100.

According to the embodiment, both the charging power for the power storage device 4 and the excitation power for the positive electrode-side charging relay CHRB and the negative electrode-side charging relay CHRG are supplied from the external charger 100 to the power receiving connector 90 as described above. In the case where the electric power (excitation power) from the external charger 100 is not normally supplied to the power receiving connector 90 due to, for example, separation of the power feed connector 110 or disconnection of the power feed cable 109 during charging of the power storage device 4 using the external charger 100, the supply of the excitation power to the positive electrode-side charging relay CHRB and the negative electrode-side charging relay CHRG is immediately cut off. This is likely to cause an arc or the like and accordingly cause adhesion of both the relays CHRB and CHRG. The configuration of the embodiment opens the positive electrode-side system main relay SMRB and the negative electrode-side system main relay SMRG at the time when it is determined that the electric power from the eternal charger 100 is not normally supplied to the power receiving connector 90 during charging of the power storage device 4 using the external charger 100 including the excitation power supply 103 for the positive electrode-side charging relay CHRB and the negative electrode-side charging relay CHRG. This configuration prevents a high voltage from being applied from the power storage device 4 to the power receiving connector 90. This is significantly effective to enhance the safety of the hybrid vehicle 1.

Furthermore, when it is determined that the electric power from the external charger 100 is not normally supplied to the power receiving connector 90, the configuration of the embodiment omits the failure diagnosis of the positive electrode-side charging relay CHRB and the negative electrode-side charging relay CHRG. This configuration enables the positive electrode-side system main relay SMRB and the negative electrode-side system main relay SMRG to be promptly opened and thereby more effectively enhances the safety of the vehicle. The low voltage-side voltage sensor 96 of the hybrid vehicle 1 is provided to detect supply or no supply of the excitation power from the excitation power supply 103 to the power receiving connector 90. The configuration of monitoring the detected value of this low voltage-side voltage sensor 96 enables a failure of supply of the charging power and the excitation power from the external charger 100 to the power receiving connector 90 due to, for example, separation of the power feed connector 110 or disconnection of the power feed connector 110 to be determined with high accuracy.

As described above, the hybrid vehicle 1 of the embodiment includes the motor MG2 configured to output the power for driving; the power storage device 4 configured to supply the electric power to the motor MG2 and the like; the positive electrode-side system main relay SMRB and the negative electrode-side system main relay SMRG provided between the motor MG2 and the like and the power storage device 4; the power receiving connector 90 placed in the charging port 9 provided in the vehicle body and configured to be connectable with the power feed connector 110 of the external charger 100; the positive electrode-side charging relay CHRB and the negative electrode-side charging relay CHRG connected with the power receiving connector 90 and connected with the power storage device 4 via the positive electrode-side system main relay SMRB and the negative electrode-side system main relay SMRG; and the charging ECU 80 serving as the control device. The charging ECU 80 determines whether the electric power is supplied from the external charger 100 to the power receiving connector 90 (step S130 in FIG. 2) during charging of the power storage device 4 with the electric power from the external charger 100 in the closed positions of the positive electrode-side system main relay SMRB, the negative electrode-side system main relay SMRG, the positive electrode-side charging relay CHRB and the negative electrode-side charging relay CHRG. The charging ECU 80 opens the positive electrode-side system main relay SMRB and the negative electrode-side system main relay SMRG when it is determined that the electric power is not supplied from the external charger 100 to the power receiving connector 90 (step S200 in FIG. 2). This configuration more effectively enhances the safety of the hybrid vehicle 1 equipped with the power storage device 4 that is configured to be chargeable with the electric power from the external charger 100.

According to the above embodiment, the external charging control routine of FIG. 2 is performed in the hybrid vehicle 1 configured such that the excitation power from the excitation power supply 103 of the external charger 100 is supplied to the positive electrode-side charging relay CHRB and the negative electrode-side charging relay CHRG. This configuration is, however, not essential. For example, according to a modification, the external charging control routine of FIG. 2 may be performed in the hybrid vehicle 1 that is equipped with an excitation power supply for the positive electrode-side charging relay CHRB and the negative electrode-side charging relay CHRG. According to the above embodiment, the determination of step S130 in FIG. 2 is performed, based on the signal input from the low voltage-side voltage sensor 96 that is provided to detect supply or no supply of the excitation power from the excitation power supply 103 of the external charger 100 to the power receiving connector 90. This configuration is, however, not restrictive. According to a modification, the determination of step S130 in FIG. 2 may be performed, for example, based on a signal input from a sensor configured to directly detect separation of the power feed connector 110 from the power receiving connector 90 or based on an abnormality detection signal sent from the control device 105 to the charging ECU 80 in the case where some abnormality occurs in the external charger 100.

Furthermore, the hybrid vehicle 1 according to the embodiment is the two motor-type hybrid vehicle. The technique of the present disclosure is, however, also applicable to a one motor-type hybrid vehicle, a series hybrid vehicle or an electric vehicle. In the hybrid vehicle 1 according to the embodiment, the charging ECU 80 controls and manages charging of the power storage device 4 with the electric power from the external charger 100. This configuration is, however, not essential. According to a modification, the series of processing with regard to charging of the power storage device 4 using the external charger 100 may be performed, for example, by the HVECU 70 or by cooperation of the HVECU 70 and another ECU. According to another modification, one of the positive electrode-side charging relay CHRB of the positive electrode-side charging power line PLc and the negative electrode-side charging relay CHRG of the negative electrode-side charging power line NLc may be omitted from the hybrid vehicle 1 described above.

As described above, according to one aspect of the present disclosure, there is provided a vehicle. The vehicle comprises a motor configured to output a power for driving; a power storage device configured to supply electric power to the motor; a main relay provided between the motor and the power storage device; a power receiving connector configured to be connectable with a power feed connector of an external charger; and a charging relay connected with the power receiving connector and connected with the power storage device via the main relay. This vehicle further comprises a control device configured to determine whether electric power from the external charger is supplied to the power receiving connector during charging of the power storage device with the electric power from the external charger in closed positions of the main relay and the charging relay and to open the main relay when it is determined that the electric power from the external charger is not supplied to the power receiving connector.

In the vehicle of this aspect, when it is determined that the electric power from the external charger is not supplied to the power receiving connector during charging of the power storage device with the electric power from the external charger in the closed positions of the main relay and the charging relay, the control device opens the main relay. Even when the charging relay has a closing failure due to adhesion or the like during charging or prior to start of charging of the power storage device using the external charger, the configuration of this vehicle prevents a voltage from the power storage device (i.e., a high voltage) from being applied to the power receiving connector placed in the charging port, which is accessible by the user or the like. This results in more effectively enhancing the safety of the vehicle equipped with the power storage device that is configured to be chargeable with the electric power from the external charger.

In the vehicle of the above aspect, excitation power may be supplied from an excitation power supply provided in the external charger to the charging relay via the power feed connector and the power receiving connector. More specifically, it is here assumed that both charging power for the power storage device and excitation power for the charging relay are supplied from the external charger to the power receiving connector. When the electric power from the external charger is not supplied to the power receiving connector due to, for example, separation of the power feed connector from the power receiving connector or disconnection of the power feed connector during charging of the power storage device using the external charger, the supply of the excitation power to the charging relay is immediately cut off. This is likely to cause an arc or the like and thereby cause adhesion of the charging relay. The vehicle of this aspect opens the main relay upon determination that the electric power is not supplied from the external charger to the power receiving connector during charging of the power storage device using the external charger including the excitation power supply for the charging relay. This configuration prevents a voltage from the power storage device from being applied to the power receiving connector and thereby more effectively enhances the safety of the vehicle.

The vehicle of the above aspect may further comprise a sensor configured to detect supply or no supply of the excitation power from the excitation power supply to the power receiving connector. The control device may be configured to determine that the electric power from the external charger is not normally supplied to the power receiving connector, when supply of the excitation power is not detected by the sensor during charging of the power storage device with the electric power from the external charger in the closed positions of the main relay and the charging relay. This configuration enables a failure of supply of the electric power from the external charger to the power receiving connector due to, for example, separation of the power feed connector or disconnection of the power feed connector, to be determined with high accuracy.

In the vehicle of the above aspect, the control device may be configured to perform failure diagnosis of the charging relay in the closed position of the main relay after completion of charging of the power storage device with the electric power from the external charger. The control device may also be configured to open the main relay without performing the failure diagnosis of the charging relay, when it is determined that the electric power from the external charger is not supplied to the power receiving connector during charging of the power storage device with the electric power from the external charger. The configuration of omitting the failure diagnosis of the charging relay upon determination that the electric power from the external charger is not normally supplied to the power receiving connector enables the main relay to be opened promptly and thereby more effectively enhances the safety of the vehicle.

According to another aspect of the present disclosure, there is a control method of a vehicle. The vehicle comprises a motor configured to output a power for driving; a power storage device configured to supply electric power to the motor; a main relay provided between the motor and the power storage device; a power receiving connector configured to be connectable with a power feed connector of an external charger; and a charging relay connected with the power receiving connector and connected with the power storage device via the main relay. The control method of the vehicle comprises determining whether electric power from the external charger is supplied to the power receiving connector during charging of the power storage device with the electric power from the external charger in closed positions of the main relay and the charging relay; and opening the main relay when it is determined that the electric power from the external charger is not supplied to the power receiving connector.

Even when the charging relay has a closing failure due to adhesion or the like during charging or prior to start of charging of the power storage device using the external charger, the configuration of this control method prevents a voltage from the power storage device (i.e., a high voltage) from being applied to the power receiving connector placed in the charging port, which is accessible by the user or the like. This results in more effectively enhancing the safety of the vehicle equipped with the power storage device that is configured to be chargeable with the electric power from the external charger.

The technique of the present disclosure is not limited to any of the embodiment and the modifications described above but may be changed, modified and altered in any of various ways without departing from the scope of the disclosure. Additionally, the embodiment and the modifications described above are only for the purpose of illustrating some concrete examples of the disclosure described in Summary and are not at all intended to limit the elements of the disclosure described in Summary.

INDUSTRIAL APPLICABILITY

The technique of the present disclosure is applicable to, for example, the manufacturing industry of the vehicle equipped with the power storage device that is configured to be chargeable with the electric power from the external charger.

The invention claimed is:

1. A vehicle, comprising:
a motor configured to output a power for driving;
a power storage device configured to supply electric power to the motor;
a main relay provided between the motor and the power storage device;
a power receiving connector configured to be connectable with a power feed connector of an external charger coupled to an AC power supply;
a charging relay connected directly to the power receiving connector and connected with the power storage device via the main relay;
a low voltage line configured to connect the charging relay to an excitation power supply of the external charger to convey an excitation power to the charging relay, wherein:
the excitation power initiates charging of the power storage device with electric power from the AC power supply, and
the excitation power is supplied from the excitation power supply, independent of the AC power supply, to the charging relay via the power feed connector and the power receiving connector; and
a control device configured to determine whether the electric power from the AC power supply is supplied to the power receiving connector during charging of the power storage device with the electric power from the AC power supply in closed positions of the main relay and the charging relay and to open the main relay when it is determined that the electric power from the AC power supply is not supplied to the power receiving connector.

2. The vehicle according to claim 1, further comprising:
a sensor configured to detect supply or no supply of the excitation power from the excitation power supply to the power receiving connector, wherein
the control device is configured to determine that the electric power from the AC power supply is not normally supplied to the power receiving connector, when supply of the excitation power is not detected by the sensor during charging of the power storage device with the electric power from the AC power supply in the closed positions of the main relay and the charging relay.

3. The vehicle according to claim 1,
wherein the control device is configured to perform failure diagnosis of the charging relay in the closed position of the main relay after completion of charging of the power storage device with the electric power from the AC power supply, and
the control device is configured to open the main relay without performing the failure diagnosis of the charging relay, when it is determined that the electric power from the AC power supply is not supplied to the power receiving connector during charging of the power storage device with the electric power from the AC power supply.

4. A control method of a vehicle, the vehicle comprising a motor configured to output a power for driving;
a power storage device configured to supply electric power to the motor; a main relay provided between the motor and the power storage device;
a power receiving connector configured to be connectable directly to a power feed connector of an external charger coupled to an AC power supply, the external charger comprising an excitation power supply; and
a charging relay connected with the power receiving connector and connected with the power storage device via the main relay, excitation power being supplied from the excitation power supply, independent of the AC power supply, to the charging relay via the power feed connector and the power receiving connector, wherein the excitation power initiates charging of the power storage device with electric power from the AC power supply;
the control method comprises:
determining whether the electric power from the AC power is supplied to the power receiving connector during charging of the power storage device with the electric power from the AC power supply in closed positions of the main relay and the charging relay; and
opening the main relay when it is determined that the electric power from the AC power supply is not supplied to the power receiving connector.

* * * * *